(12) United States Patent
Wells

(10) Patent No.: US 7,699,018 B2
(45) Date of Patent: Apr. 20, 2010

(54) METHOD AND APPARATUS FOR REPELLING GEESE

(76) Inventor: Thomas G. Wells, 7200 Overcliff Rd., Cincinnati, OH (US) 45233-1038

( * ) Notice: Subject to any disclaimer, the term of this patent is extended or adjusted under 35 U.S.C. 154(b) by 0 days.

(21) Appl. No.: 11/673,899

(22) Filed: Feb. 12, 2007

(65) Prior Publication Data

US 2007/0193498 A1 Aug. 23, 2007

Related U.S. Application Data

(60) Provisional application No. 60/774,591, filed on Feb. 17, 2006.

(51) Int. Cl.
*A01M 29/00* (2006.01)

(52) U.S. Cl. .................. 116/22 A; 119/713; 340/573.2; 441/16; 441/28

(58) Field of Classification Search .............. 116/22 A, 116/22 R, 63 R, 63 P, 63 C, 63 T, 200, 202, 116/DIG. 26; 119/713, 703, 903; 340/573.2, 340/573.3; 43/1–3; 441/6, 11, 13, 28
See application file for complete search history.

(56) References Cited

U.S. PATENT DOCUMENTS

| | | | | |
|---|---|---|---|---|
| 364,573 A * | 6/1887 | Brinkop | ............................ | 43/3 |
| 2,367,818 A * | 1/1945 | Diehl | .......................... | 441/16 |
| 2,790,263 A * | 4/1957 | Chaney | .......................... | 43/17 |
| 3,307,208 A * | 3/1967 | Jacobson | ...................... | 441/13 |
| 3,698,025 A * | 10/1972 | Worobel | ...................... | 441/16 |
| 3,939,510 A * | 2/1976 | Curd, Jr. | ...................... | 441/28 |
| 4,099,282 A * | 7/1978 | Townsend | .................... | 441/16 |
| 4,131,079 A * | 12/1978 | Rousseau et al. | .......... | 116/22 A |
| 4,656,770 A * | 4/1987 | Nuttle | .............................. | 43/2 |
| 4,763,126 A * | 8/1988 | Jawetz | ........................ | 340/985 |
| 4,896,620 A * | 1/1990 | Jones | ........................ | 114/253 |
| 5,367,442 A * | 11/1994 | Frost et al. | .................. | 362/183 |
| 5,450,063 A * | 9/1995 | Peterson et al. | .......... | 340/573.2 |
| 6,394,630 B1 * | 5/2002 | Skidmore et al. | ........... | 362/394 |
| 6,557,482 B1 * | 5/2003 | Doty et al. | ................. | 116/22 A |
| 6,573,659 B2 * | 6/2003 | Toma et al. | .................. | 315/149 |
| 6,575,597 B1 * | 6/2003 | Cramer et al. | .............. | 362/259 |
| 6,681,714 B1 * | 1/2004 | Johnson | ..................... | 116/22 A |
| 6,718,681 B2 * | 4/2004 | Bhullar | ............................ | 43/1 |
| 6,742,471 B2 * | 6/2004 | Laidler | ..................... | 116/22 A |
| 7,052,348 B2 * | 5/2006 | Price et al. | .................. | 441/136 |
| 7,196,477 B2 * | 3/2007 | Richmond | .................. | 315/149 |
| 7,225,580 B1 * | 6/2007 | Chou | .......................... | 43/17.5 |
| 7,278,375 B2 * | 10/2007 | Ross et al. | .................. | 119/719 |
| 7,324,409 B1 * | 1/2008 | Zweesaardt et al. | ......... | 367/139 |
| 2003/0201874 A1 * | 10/2003 | Wu | .......................... | 340/384.2 |
| 2007/0188334 A1 * | 8/2007 | Spiegel | ..................... | 340/573.3 |
| 2007/0205904 A1 * | 9/2007 | Froehner | ................. | 340/573.2 |

* cited by examiner

*Primary Examiner*—Amy Cohen Johnson
(74) *Attorney, Agent, or Firm*—Wood, Herron & Evans, LLP

(57) ABSTRACT

Apparatus and methods for repelling geese include a solar-powered, photocell controlled flasher for disposition on a body of water or on land where geese inhabit. The method includes the steps of intermittently flashing a light into an area where geese sleep, and disturbing the geese from rest.

5 Claims, 5 Drawing Sheets

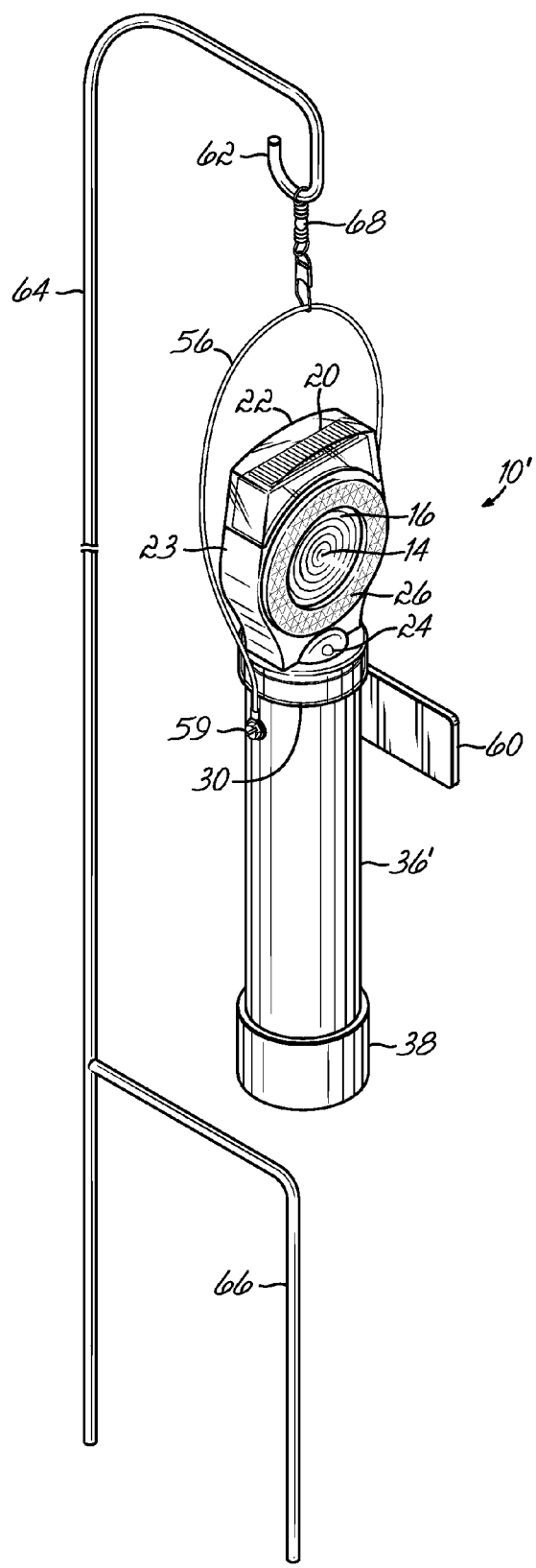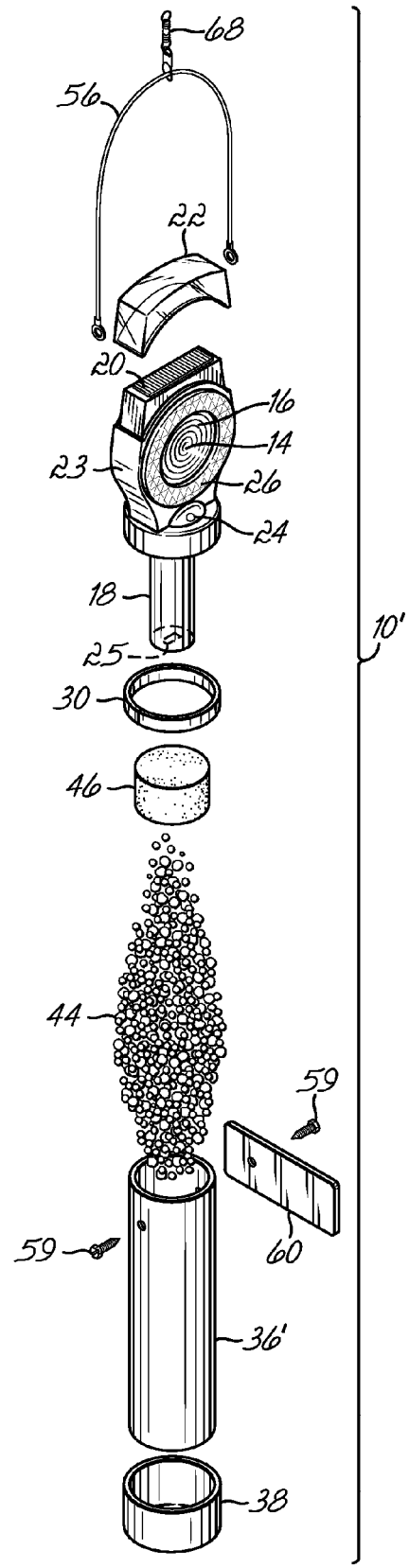
FIG. 3
FIG. 4

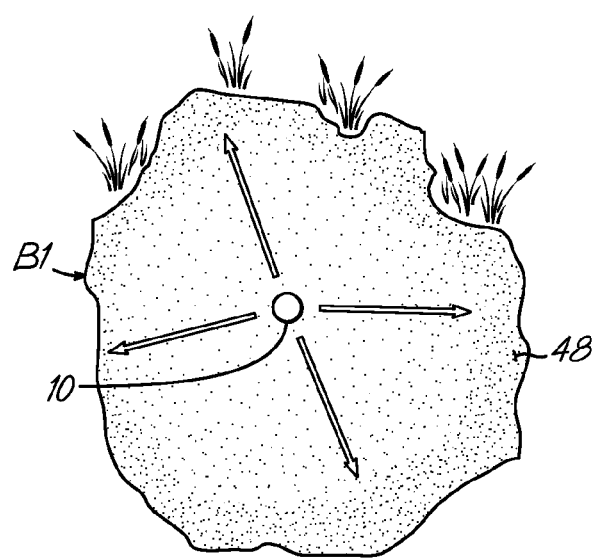
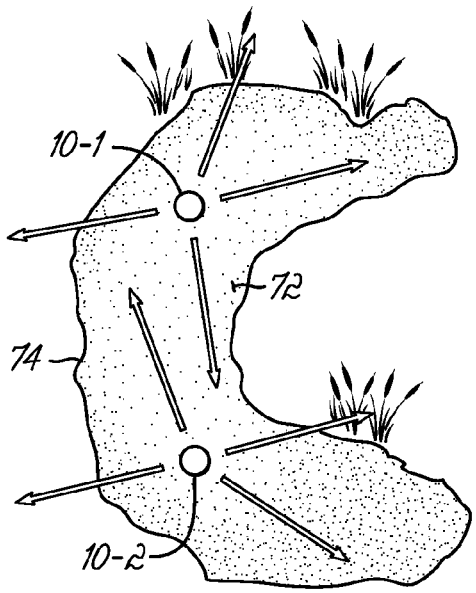
FIG. 6　　　　　FIG. 7
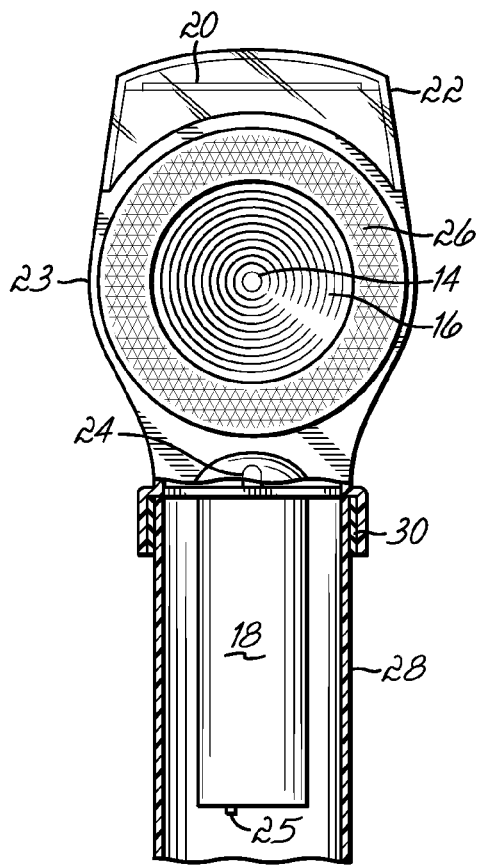
FIG. 8

METHOD AND APPARATUS FOR REPELLING GEESE

CROSS REFERENCE TO RELATED APPLICATIONS

Applicant claims the benefit of the filing date of Feb. 17, 2006 of applicant's U.S. provisional patent application Ser. No. 60/774,591. Said application is expressly incorporated herein by reference in its entirety.

FIELD OF THE INVENTION

This investigation relates to apparatus and methods for repelling geese from areas where they and their problems are not desired.

Though Canada Geese can be beautiful from afar, up close their presence is often an unwelcomed nuisance. Canada Geese are extremely territorial and tend to settle on small ponds or lakes, often times at golf courses, residential or industrial ponds or other wet areas where human activity is in close proximity. Claiming the area as their own, they leave the private owners and users of these lakes, ponds and natural areas with little option but to live with the geese and the nuisances they bring with their presence. They are loud, which takes away from the peaceful environment that the setting has served. The geese are extremely messy, as each goose drops up to over a pound of excrement daily. These droppings are detrimental to good health, good landscaping and greens keeping, aesthetics and the environment as viewed and used by humans.

Furthermore, the unpleasant disposition and territorial nature of the geese, combined with the large numbers in which they settle, makes a very unpleasant environment where people inhabit, use or enjoy.

BACKGROUND OF THE INVENTION

There have been many attempts at products and solutions to rid areas of unwanted geese. Most involve high maintenance products and techniques, such as spraying the areas with a ground spray and respraying days later, or installing speakers to emit geese distress calls in the area or sirens. Spray effectiveness is finite, costly and must be replenished as dictated by the environment. Loud speakers are annoying, troublesome and require an electrical source and operational attendance.

Other labor intensive solutions involve planting buffers around the water, keeping swans or other natural predators around, bringing in dogs on a daily basis to scare the geese, or in some cases authorizing selected hunters to cull the geese. Many of these current solutions are not acceptable to humans, such as the noise of distress calls or sirens mounted on and around buildings, and concerns over chemical sprays, dogs or firearm discharge in populated areas. The common factor among all of these resolutions is that they require a large amount of effort yet produce inconsistent, at best, and short-lived results. Results are typically not permanent without costly and disturbing repeatability.

Accordingly, it is one objective of the invention to provide improved apparatus for repelling geese.

Another objective of the invention has been to provide improved methods for repelling geese.

A further objective has been to provide improved apparatus and methods for repelling geese and which requires minimum maintenance, repeatability and human attention as compared to prior apparatus and methods.

Another objective of the invention has been to provide apparatus and methods for repelling geese through the interruption of a natural life cycle of the geese.

SUMMARY OF THE INVENTION

To these ends, a preferred embodiment of the invention stems from applicant's discovery that geese will not stay where they cannot rest, and more particularly, sleep. Apparatus and methods according to the invention thus provide interruption to the rest or sleep cycle of geese, causing them to depart the area in which the apparatus and methods are deployed, according to the invention.

This invention is based on applicant's unique discovery that geese will not stay or reside where they cannot rest and sleep in the dark, combined with an apparatus and process for arresting that rest. According to the invention, one embodiment of the invention includes a strobe or flashable light, preferably an L.E.D. light for longevity, producing a repeating flash such as at a frequency of every second, and mounted on a flotation device, anchored to the bottom of an afflicted pond. Alternately, the light is mounted on dry land in an area where geese congregate to rest.

The light is powered by batteries which are charged by a solar panel and is activated at night by a photocell. Circuitry is provided to control flashing of the light at a predetermined frequency, and encapsulation or other means are used to render the electronics waterproof.

Once installed, the apparatus does not require human attention. The structure withstands stresses and rigors from its natural surroundings. The light functions to flash all night and every night, emitting flashes of light along the surface of the water, or ground over which it is employed. These flashes grossly disturb the geese as they try to settle and rest. Deterred by the lack of rest the flashing light causes, the geese will simply move on to another site, leaving the area undisturbed in the future.

Unlike chemicals, audio devices, dogs, firearms and physical barriers, the flashing light is unobtrusive to humans and far less marring of the natural environment.

In particular, the light can be highly collimated or directed at very low angles across the surface of a pond and to its adjacent banks, so as not to disturb any nearby human presence such as a residence or place of business. A dozing goose is interrupted by the light flash, frequently jerking erect, and cannot rest, much less sleep. Even if geese fly into a pond and settle there, the nightly flashes drive them away, even after a single night or part thereof and they do not return. This not only interrupts their required rest of sleep cycle in their immediate habitation of the area, but their flight from the area interrupts their nesting cycle there or they do not return, seeking other more habital areas conducive to rest and other life cycle activities.

Alternatively, the apparatus could be mounted on a dock, the bank of a water body, a boat, a buoy, or otherwise in the environment from which geese are to be repelled, or with any form of lense, control or mounting used to direct the light flashes into the area where geese are attempting to sleep and without directing the light in such a way as to interfere with nearby human activities or presence,

BRIEF DESCRIPTION OF THE DRAWINGS

These and other objectives and advantages will become readily apparent from the following written description of detailed embodiments of the invention and from the drawings in which:

FIG. 3 is a perspective view of a second embodiment of the invention;

FIG. 4 is an exploded view of the components of the invention of FIG. 3;

FIG. 6 illustrates a plan view of the function of the embodiment of FIGS. 1 and 2 of the invention for function across a water surface adjacent land;

FIG. 7 also illustrates a plan view of the function and deployment of two embodiments of the invention of FIGS. 1 and 2 used together to function over adjacent areas of an irregular border water surface and surrounding land; and FIG. 8 is a cross-sectional view of the intersection of the light housing, housing tube and seating ring of the invention.

DETAILED DESCRIPTION

Figure 1:
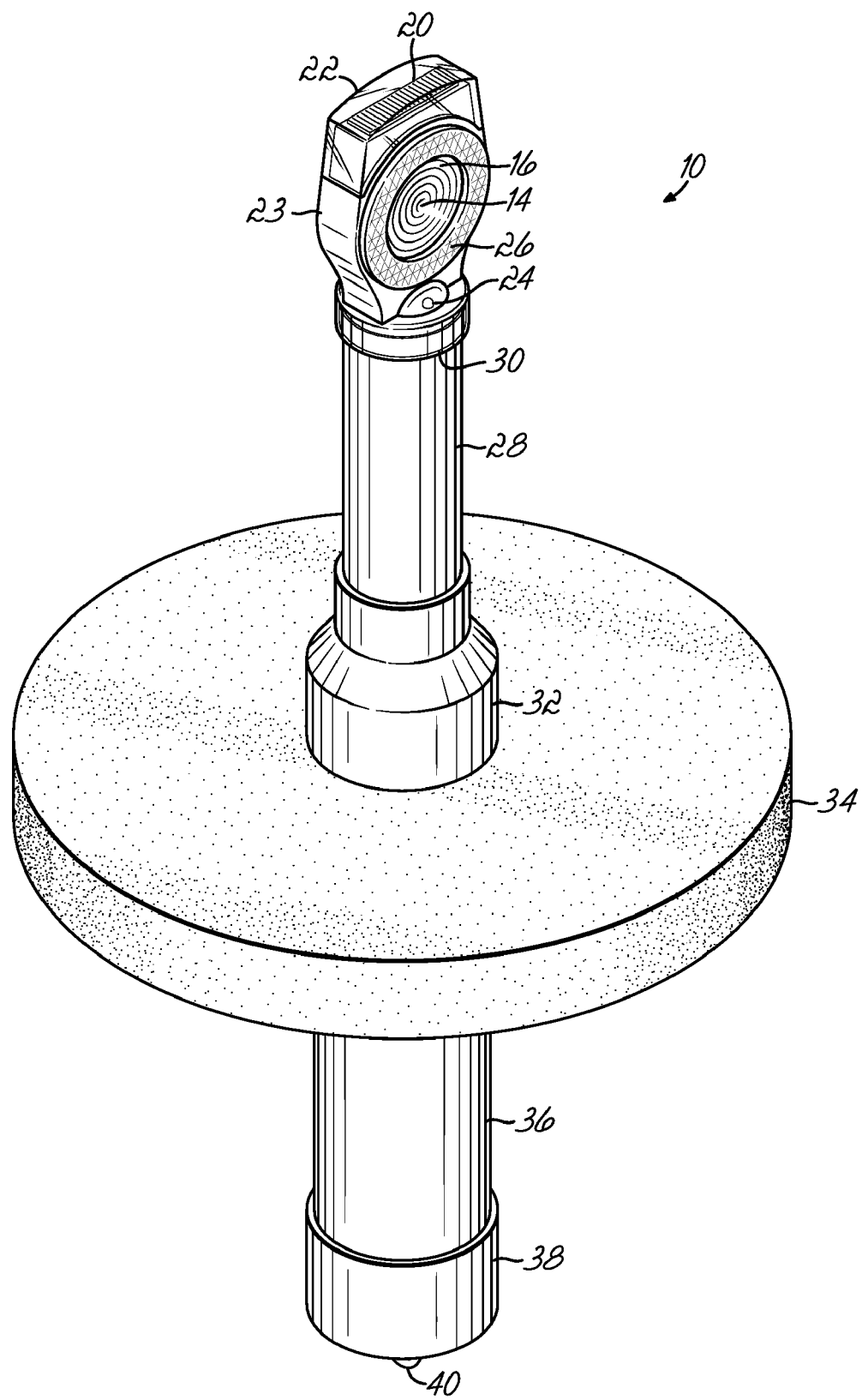
FIG. 1 is a perspective view of one assembled embodiment of the invention.
Figure 2:
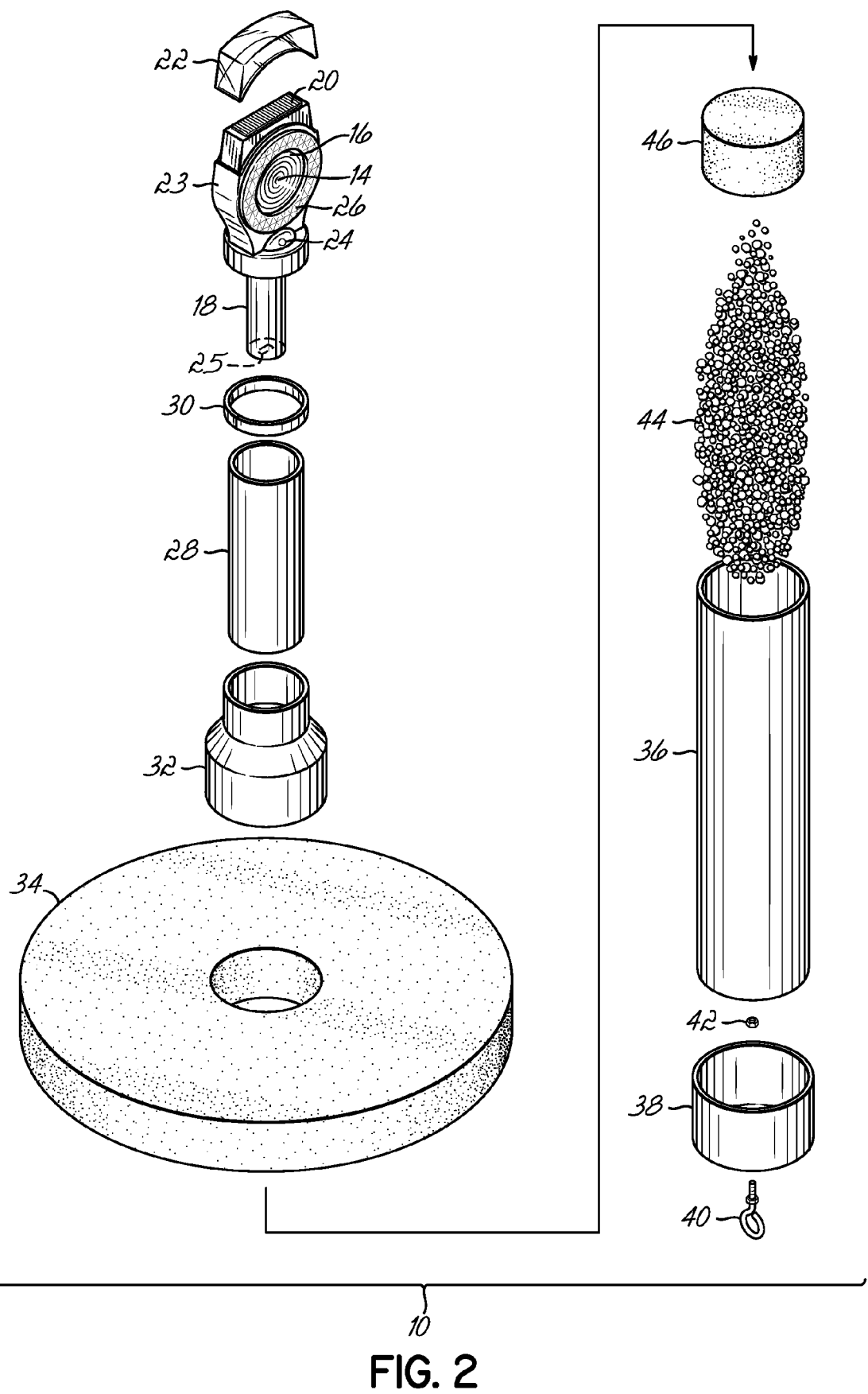
FIG. 2 is an exploded view of the components of the invention of FIG. 1.

Turning now to FIGS. 1 and 2, a first embodiment of the geese repeller 10 of the invention is illustrated.

Repeller 10 includes a light source 14 such as an LED or other suitable light source, a lense 16, a battery 18, a solar panel 20 for charging batter 18, a weather shield 22 to protect panel 20 yet allow energizing light to pass therethrough, a housing 23 and circuitry (not shown) for passing energy from panel 20 to charge battery 18, and for passing electrical energy from batter 18 to light source 14 to cause the light source to emit light at a predetermined frequency when the circuitry is enabled by a photocell sensor and switch 24 and on/off switch 25 (FIG. 2). A focus ring 26 is provided to focus or colunmize light from light source 14.

These components are preferably all contained in a self-contained unit. They may be individually made and assembled, or are currently available as embodied in products for other uses, such as in night-time traffic channelization or warning devices. One form of such a solar powered photo activated light source is the product sold for other purposes under the model number and name SW-JSL003 Sunnyworld, from Shenzhen Xinhonghua Solar Energy Co., Ltda., 4/Fl., Baoyuan Industrial Buld., yuanfen intersection, Bulong RD., Longhua Town, Bao'an District, Shenzhen, Guangdong, China.

Any other similar combination of such components could be used as will be readily apparent from the disclosure herein. This particular model is disclosed only as one suitable form of solar-charged, battery operated, photocell controlled, flashing light source useful as described in this invention.

It will also be appreciated that any on/off switch and any adjustable focusing ring could be omitted, these being useful but optional and not necessary to the ultimate function of this invention. It will also be appreciated that other energy sources than solar power could be used, such as mechanically actuated electrical energy storage devices operated by water wave oscillation, wind or other physical motion could be used. Also, other electrical storage devices such as extreme long term batteries, capacitors or the like could be used, as well as a variety of light sources found suitable.

Nevertheless, the foregoing components of this particular embodiment of the invention have been found useful.

Continuing with a description of the apparatus of this embodiment, the invention includes a housing in the form of housing tube 28, sealing ring 30, sealing collar 32, flotation ring 34, ballast tube 36, end cap 38, anchor attaching eye-bolt 40, nut 42, ballast 44 and plug 46. The structure of the lower portion of the light housing 23, tube housing 28 (and 36') and sealing ring 30 is best illustrated in the cross-sectional view of FIG. 8. It will be appreciated that ring 30 is preferably of any suitable sealing material, typically resilient. The light housing 23 and tube housings 28, 36' are joined with ring 30 therebetween and held together by friction or could be adhered with any appropriate adhesive.

Flotation ring 34 may be made of any suitable floatable material such as closed cell polyethylene or any material suitable for floating as described herein. In addition, other forms of flotation devices could be used to float the light and its electrical components and housings. Pontoons, air-filled floats, expansible bladders, buoys or any other suitable devices could be used.

Figure 5:
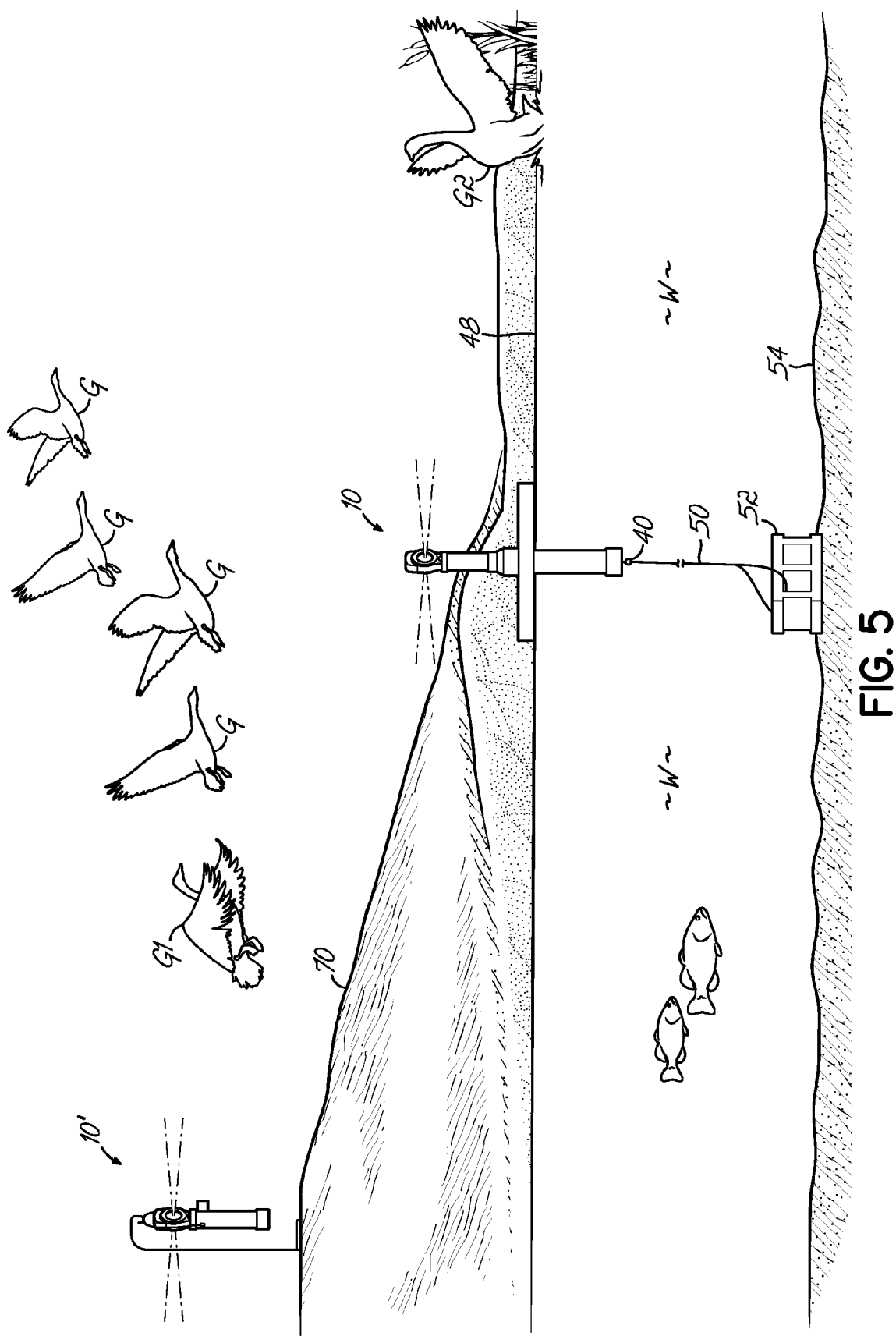
FIG. 5 is an elevational view diagrammatically depicting deployment and use of both embodiments of FIGS. 1-4 of the invention, it being understood that deployment of both embodiments in adjacent areas is not necessary; one embodiment being useful to provide the function and advantages of the invention.

In use, once any on/off switch 25 is positioned to an "on" position, the repeller 10 is placed on the surface 48 of a body of water and floats thereon, preferably anchored through a tether to an anchor such as represented by a concrete block 52 or other suitable anchor on the bottom 54 of the body of water (see FIG. 5). Light energy from the sun or other source is received by the solar panel 20 which converts the energy and charges the battery 18. Once night falls, the photoelectric cell or sensor 24 connects the battery to the appropriate circuitry to energize the light source 14 to blink or flash at a frequency such as at once per second, or any other useful frequency.

When the repeller 10 is deployed on a water body on or near which geese are attempting to rest or sleep, the intermittent flashing prevents them from fully sleeping or getting the rest they require. Not being comfortable in that environment, they leave. This interruption of their rest or sleep thus repels them to other areas where they do not have to put up with the aggravation. They thus depart, and with them their droppings, noise and other aggravating features of their presence. Moreover, they do not remain in the area for nesting, and no goslings acquire any tendency to return to that area at later times.

It will be appreciated that the light emitted from repeller 10 is preferably cast low across the water surface 48 or nearby land banks. This direction is sufficient to disturb the geese but not so intrusive as to disturb human presence such as in a nearby residence, building or business. The light emitted can be controlled by lens 16 or by any suitable beam focus 26, by reflectors or any suitable means to cover a desired area out from the light but not cover higher areas, paths or other adjacent areas.

Turning now to an alternative embodiment as disclosed in FIGS. 3 and 4, such embodiment is sometimes useful when deploying a repeller 10' (FIG. 3) on a land surface as opposed to a water surface. Repeller 10' is thus similar to repeller 10 with the exception of a need for a housing 28 and flotation ring 34. Identical reference numbers refer to parts essentially identical to those in repeller 10.

Repeller 10' includes, instead, a ballast tube 36' connected or sealed directly to the light housing 23, and as described above by ring 30. Tube 36' is of sufficient size to accommodate any ballast 44, and a battery 18, above plug 46.

A bail 56 is secured to tube 36' by screws 59 or any suitable fasteners, and a wind vane 60 is fastened to tube 36' (such as by one screw 59) so that a majority of the vane extends away tangentially from one side of tube 36'.

A mounting standard such as a hook 62 with a leg 64 and preferably support leg 66 is provided. A common fisherman's swivel 68 is preferably connected between hook 62 and bail 56. In use, when legs 64, 66 are pushed into the ground, the repeller 10' hangs from hook 62. Wind pressure on vane 60 causes rotation of repeller 10' so the emitted light beam may randomly be directed through 360 degrees. Alternately, vane 60 is omitted and repeller 10' attached to hook 62 in any way to prevent its rotation.

Function of repeller 10' is like that of repeller 10.

Turning now to FIGS. 5-7 illustrating deployment and use of repellers 10 and 10', FIG. 5 illustrates the use of both. Both can be used in conjunction as shown, repeller 10 on water surface 48 or repeller 10' on land surface 70. Both function as noted above, causing geese "G" to depart. Goose G1 illustrates a goose disturbed in water "W" by the flash of light from repeller 10 while goose G2 illustrates a departing goose having been disturbed by the repeller 10'.

FIGS. 6 and 7 illustrate variable uses of repellers 10. In FIG. 6 the surface 48 of water body B1 is fairly regular. Accordingly, one repeller 10 is used, anchored in the general center area of surface 48.

In FIG. 7, the water surface 72 has a very irregular shore line 74. Accordingly, a first repeller 10-1 and a second repeller 10-2 are deployed as shown to insure full coverage of water surface 72.

It will also be appreciated that light emitted from repellers 10 of FIGS. 6 and 7 cover an adjacent area of bank or land surface to surfaces 48 and 72. Those repellers operate also to repel geese from land areas immediately adjacent the respective water surfaces.

Preferably, the repellers 10, 10' as described, emit sufficient disturbing light to cover an area of about two to five acres presuming the repeller is generally located in the area, and depending on the typography and boundary of the area in which the repeller is mounted. Preferably, a repeller is positioned within about 900 feet of direct sight-line to an area inhabited by undesired geese. Varied combinations of repellers are strategically placed within these parameters to provide significant beneficial results, presuming each repeller emits a measure of light substantially equal to that of a 100 watt bulb in the desired direction and at each flash. It will be appreciated that the light source, as well as the energy source may be modified to produce either a stronger or weaker flash where desired.

Thus, a method for repelling geese according to the invention includes intermittently flashing a light into areas where geese sleep and disturbing the geese from rest. Further, a method for repelling geese includes the steps of converting light energy impinging on a solar panel to charge a battery, automatically initiating flashing of light into a geese-inhabited area in response to sensing nightfall and automatically ceasing said flashing upon sensing daytime.

These and other benefits and advantages will become readily apparent to those of ordinary skill in the art without departing from the scope of the invention, and applicant intends to be bound only by the claims appended hereto.

What is claimed is:

1. Apparatus for repelling geese and comprising:
    a flashing light source;
    a power source including a solar cell for providing electricity from sunlight for energizing said flashing light source in the nighttime;
    a switch operably connecting said power source to said flashing light source in the nighttime to cause said flashing light source to flash;
    a housing tube having an upper end and a lower end, said light source mounted proximate said upper end of said housing tube;
    said solar cell mounted above said flashing light source;
    a battery disposed in said housing tube below said flashing light source, said battery operatively coupled to said solar cell for charging;
    a ballast tube having an upper end and a lower end, said ballast tube mounted below said housing tube;
    a sealing collar coupling the lower end of said housing tube and the upper end of said ballast tube;
    a float member, said float member disposed proximate the lower end of said housing tube and proximate the upper end of said ballast tube and for floating said apparatus when placed in the water;
    said housing tube disposed above said float member, with said battery therein disposed above said float member and said ballast tube extending below said float member; and
    a ballast in said ballast tube for urging said housing tube into an upright position when said apparatus is floated in water.

2. Apparatus as in claim 1 further including a plug in an upper end of said ballast tube isolating said ballast from said housing tube.

3. Apparatus as in claim 2 further including an anchor connector secured to a lower end of said ballast tube.

4. A method of providing apparatus for repelling geese including the steps of:
    mounting a light source on an upper end of a housing tube for disposition in a nocturnal nesting area of geese;
    mounting a solar cell above said light source for converting solar energy to electrical energy for charging a battery in said housing tube, said battery operatively and selectively being operatively connectable to a light source when no solar energy is being converted;
    mounting a float proximate a lower end of said housing tube with an upper end of said housing tube extending above said float;
    mounting a ballast tube below said housing tube, said ballast tube extending below said housing tube and said float; and
    placing ballast in said ballast tube; and
    mounting a sealing collar to a lower end of said housing tube and an upper end of said ballast tube such that said housing tube is disposed above said float member, with said battery therein disposed above said float member and said ballast tube extending below said float member.

5. A method of repelling geese including the steps of:
    collecting solar energy from a position located above a flashable light source;
    converting solar to electrical energy;
    charging a battery disposed below said light source with said electrical energy;
    selectively connecting said battery to said light source for flashing said light source into a nocturnal nesting area of geese;
    selectively disconnecting said light source from said battery in the daytime;
    floating said light source above a water surface by providing a housing tube having an upper end and a lower end, said light source mounted proximate said upper end of said housing tube, said battery disposed in said housing tube below said light source, providing a ballast tube having an upper end and a lower end, said ballast tube mounted below said housing tube, providing a sealing collar coupling the lower end of said housing and the upper end of said ballast tube, providing a float member disposed proximate the lower end of said housing tube and proximate the upper end of said ballast tube, such that said housing tube is disposed above said float member and said ballast tube extends below said float member, and providing a ballast in said ballast tube.

\* \* \* \* \*